N. S. BEEBE.
COMBINED PAN LIFTER AND STRAINER.
APPLICATION FILED JUNE 9, 1919.
1,325,613.
Patented Dec. 23, 1919.
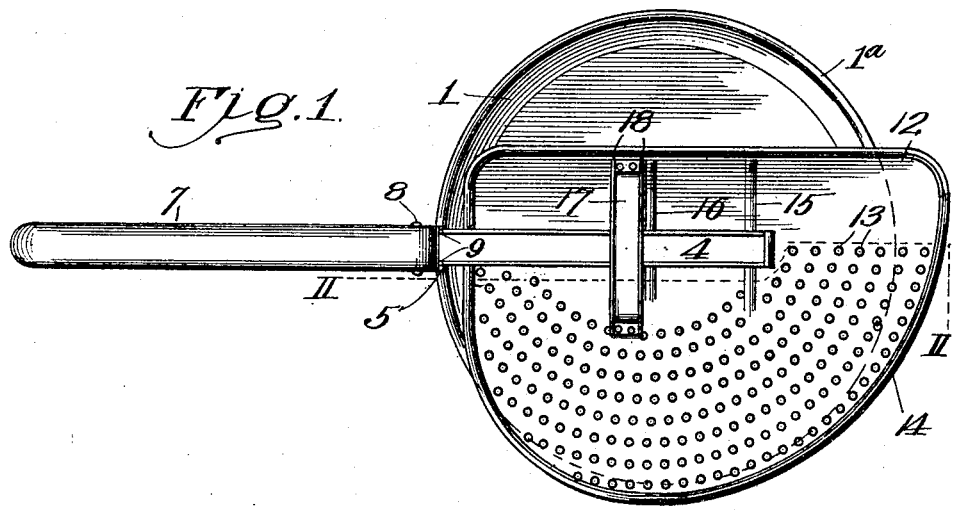
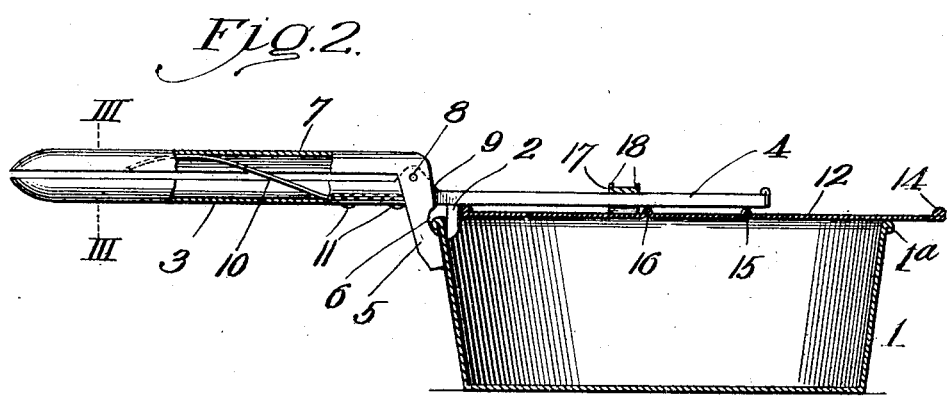
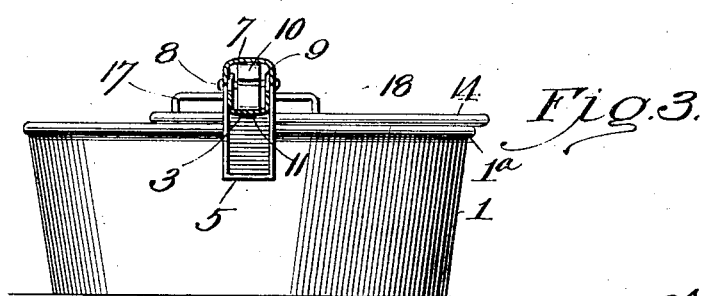
Inventor
N. S. Beebe.
By George J. Thorpe
Atty.

UNITED STATES PATENT OFFICE.

NATHAN S. BEEBE, OF KANSAS CITY, MISSOURI.

COMBINED PAN LIFTER AND STRAINER.

1,325,613.  Specification of Letters Patent.  Patented Dec. 23, 1919.

Application filed June 9, 1919. Serial No. 302,853.

*To all whom it may concern:*

Be it known that I, NATHAN S. BEEBE, a citizen of the United States, residing at Kansas City, in the county of Jackson and State of Missouri, have invented certain new and useful Improvements in Combined Pan Lifters and Strainers, of which the following is a specification.

This invention relates to combined pan lifters and strainers and has for its object to produce a device of this character whereby hot pans and other kitchen utensils may be easily and securely gripped and lifted and their contents strained by tipping the vessel without danger of burning the hands of the operator.

A still further object is to produce a device of this character which is adjustable to different size vessels, and which is strong and durable in character but which may be manufactured cheaply.

With these general objects in view the invention consists in certain novel and useful features of construction and organization of parts as hereinafter described and claimed; and in order that it may be fully understood reference is to be had to the accompanying drawing, in which:

Figure 1, is a top plan view of the device applied to a utensil to be lifted and its contents strained.

Fig. 2, is a section on the line II—II of Fig. 1, part of the handle of the device being broken away to disclose more clearly the handle opening spring.

Fig. 3, is a section taken on the line III—III of Fig. 2.

In the said drawing, 1 indicates a cooking utensil of the customary character which is provided at its margin with the bead 1ª. Extending into the interior of the utensil is a stationary gripping jaw 2, which rigidly depends from a handle 3 and an extension thereof 4 which is of channel form to provide strength and rigidity with minimum weight.

Diametrically opposite the stationary gripping jaw 2 is a movable gripping jaw 5 provided with a circular recess 6 for the reception of the customary bead on kitchen pans of various characters, said jaw being formed integrally with the movable handle 7 pivoted at 8 to ears 9 formed on the stationary handle.

A spring 10, riveted at 11 to the stationary handle 3, normally tends to open and hold in such position the handles of the lifter and strainer, and hence to hold the jaws of the device in their open positions.

Resting upon the bead of the vessel to be lifted and its contents strained and extending over the greater part of the surface thereof, is a strainer plate 12, provided with a plurality of series of perforations 13 through which the contents of the vessel may be strained, and said strainer plate has at its outer margin a circular bead 14. At suitable distances apart on the surface of the strainer, ribs 15 and 16 are pressed upwardly, and form abutments for the extension arm 4 which fits under a clip 17 produced from a flat piece of metal and riveted to the strainer 12, and having its edges turned up to form reinforcing or stiffening flanges 18. Said clip must possess more or less resiliency to provide for adjustments of the device to vessels of different sizes, as with a vessel of large size the extension 4 and strainer 12 may be moved so that said extension does not find support on rib 15, but rests solely on rib 16, as will be readily understood from the drawing.

It will be noted that the inner faces of the gripping jaws are not parallel to each other, as it has been found that the stationary gripping jaw does not necessarily have to depend very far into the vessel to be lifted and strained, and that it may be formed at right angles to its handle, while the movable jaw must bear such a relation to its handle, that when closed on the side wall of a vessel the inner face of the jaw will be parallel and abut the outer face of the vessel and will thereby tend to press the vessel against the short jaw as a pivot and clamp the pan tightly against the strainer, hence against the extension arm whose upward movement will be resisted by the resilient clip 17.

It will also be noted that all of the parts of this device are formed from flat metal plates pressed into shape, thus rendering the device economical in manufacture but possessing the required stiffness for its proper operation.

It will also be apparent that by having the ribs 15 and 16 and clip 17 of considerable length, the strainer can be set at an angle to the handle should such adjustment be found desirable for the more effective covering of a particular vessel.

It will be further noted that a device of this character so firmly grips the vessel being lifted that it cannot rotate or slide, and that the bead 1ª forms a shoulder against any possibility of the vessel dropping from between the jaws as long as the grip upon the handle is maintained, and that immediately such grip is released, the spring will reopen the handles and the jaws preliminary to the removal of the device from the vessel.

From the above description it will be apparent that I have produced a device of the character described, which possesses all of the features of advantage pointed out as desirable and while I have described and claimed the preferred embodiment of the same, it will be understood that I reserve the right to all changes properly falling within the spirit and scope of the appended claims and the principle of construction involved.

I claim:

1. A device of the character described, comprising handles pivoted together, jaws rigid with said handles for clamping engagement with the wall of a pan, an extension for the handle of the inner jaw, to extend over the wall of the pan, a flat strainer having one or more upwardly projecting ribs, and a clip secured to the strainer and fitting over the said extension for holding the strainer and a rib thereof in frictional engagement with the underside of the said extension.

2. A device of the character described comprising a pair of handles pivoted together, jaws depending from said handles for clamping engagement with the wall of a pan, the handle having the jaw for engaging the inner side of said wall, having an extension to overlie the pan, and a strainer mounted on said extension for edgewise movement in any direction and adapted to fit down on the said pan; the outer jaw of said pair of jaws depending to a lower point than the inner jaw and exerting leverage on the pan tending to raise the opposite side of the same.

3. A device of the character described, comprising handles pivoted together and provided at their front ends with depending jaws, the handle having the innermost jaw, having an extension, a spring tending to hold said handles and jaws open, a flat strainer underlying the said extension, and a clip secured to the strainer and fitting over the extension and clamping said elements frictionally together.

In testimony whereof I affix my signature.

NATHAN S. BEEBE.